Feb. 8, 1927.
H. L. MERRICK
1,616,503
WEIGHING MECHANISM
Filed Aug. 12, 1922    3 Sheets-Sheet 2
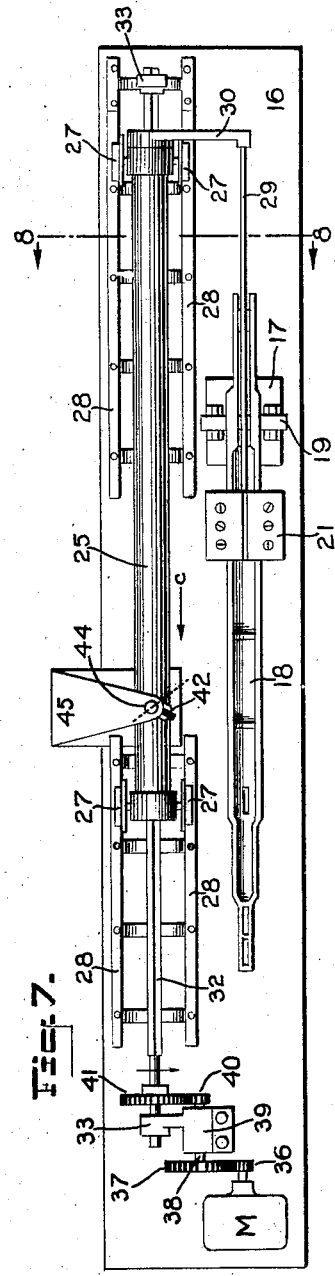
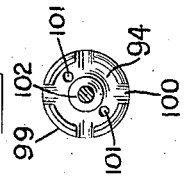
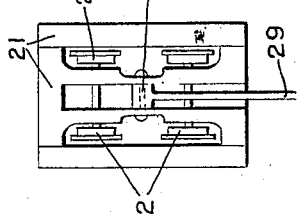
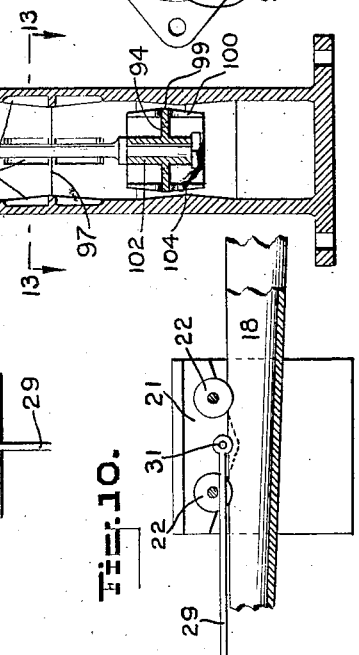
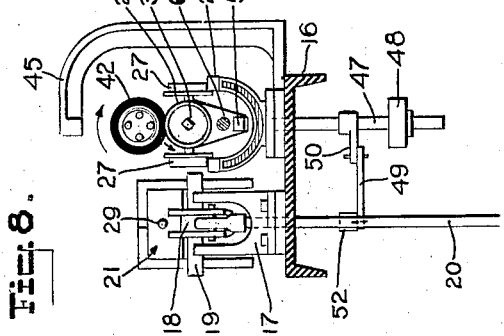
Inventor:—
H. L. MERRICK,
By his Attorney Feb. 8, 1927.
H. L. MERRICK
WEIGHING MECHANISM
Filed Aug. 12, 1922      3 Sheets-Sheet 3
1,616,503
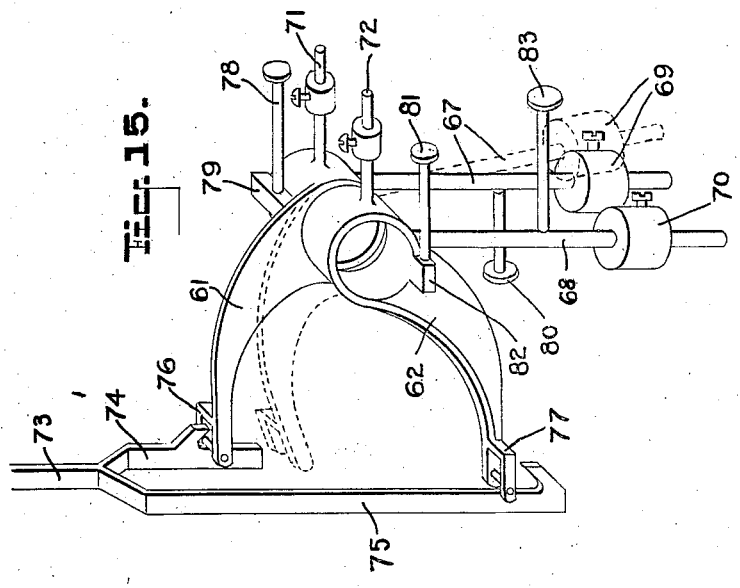
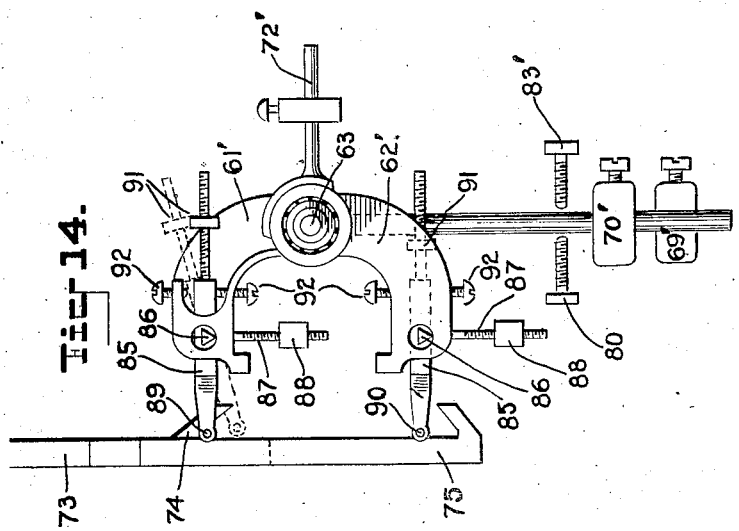
Inventor:
H. L. MERRICK,
By his Attorney
John O. Seifert Patented Feb. 8, 1927.

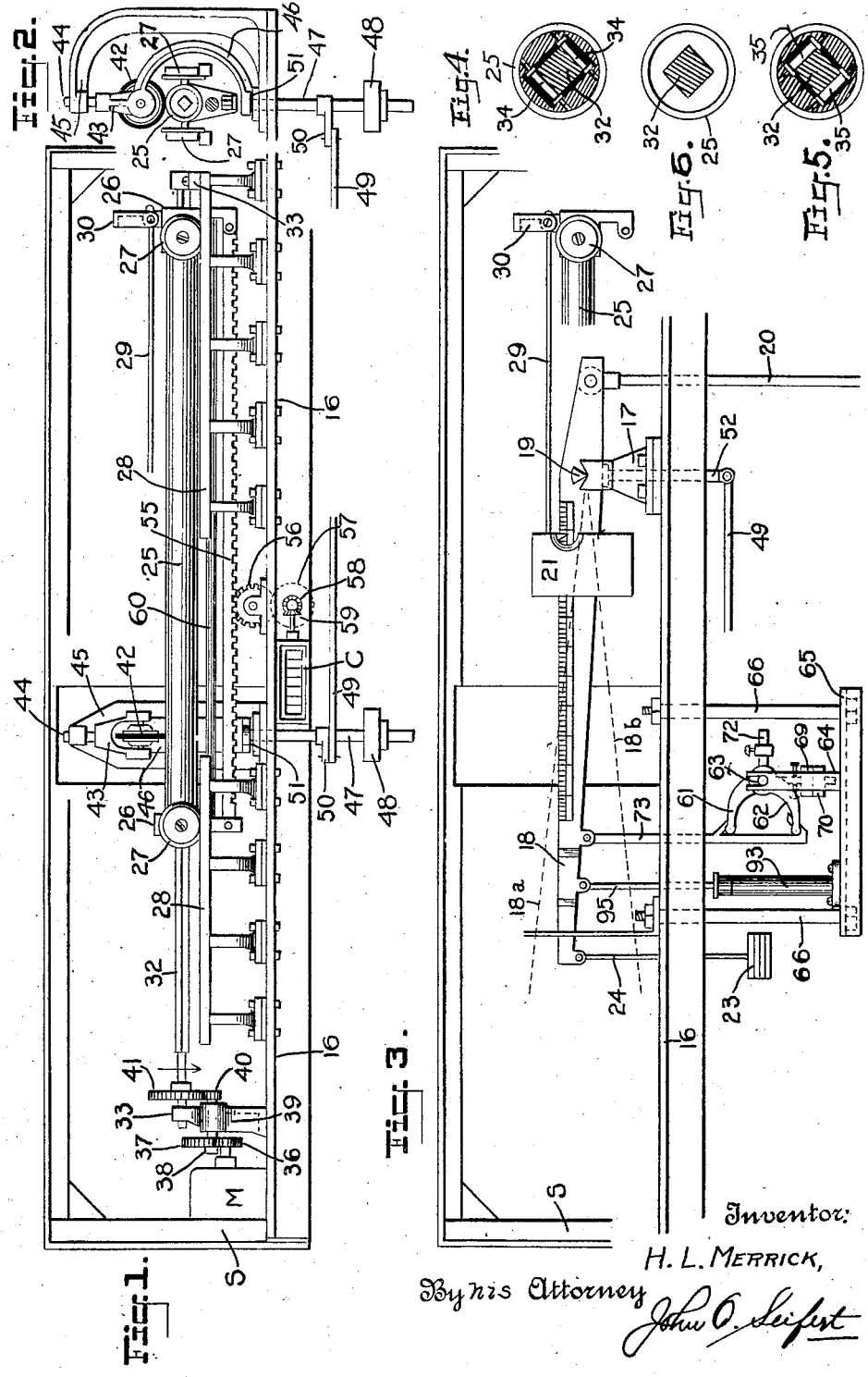

1,616,503

UNITED STATES PATENT OFFICE.

HERBERT L. MERRICK, OF PASSAIC, NEW JERSEY.

WEIGHING MECHANISM.

Application filed August 12, 1922. Serial No. 581,343.

This invention relates to weighing mechanism of the type disclosed by my co-pending application Serial No. 438,821 in which counterpoise is adjustably mounted upon a beam to bring the latter into equilibrium with a load supported thereby, said counterpoise being automatically adjusted along the beam when the beam is deflected or moved out of equilibrium through a pair of frictionally co-operating members normally traveling in the same direction, one of which is rotatable and connected to the counterpoise and movable longitudinally of the beam, and the other member being adjustable by the deflection of the beam to change the direction of travel thereof in angular relation to the axis of rotation of the member connected to the counterpoise. In the structure of said application the longitudinally movable member is mounted upon a carriage movable upon a track longitudinally of the beam and is rotated by means, such as an electric motor, which is mounted upon the carriage to participate in the movement of said carriage, and it is the primary object of the invention to provide an improved construction and arrangement of parts of said mechanism to greatly increase the efficiency thereof.

It is an object of the present invention to effect the above mentioned result by providing an improved arrangement of mounting of the rotatable and longitudinally movable member and of the mounting of the driving means for said member, and to provide an improved arrangement of mounting and connection of the adjustable friction member to the scale beam to control the direction of travel thereof and thereby control the direction of movement of the longitudinally movable member and the adjustment of the counterpoise upon the beam.

In carrying out this feature of the invention I provide a shaft journaled in fixed bearings to rotate on an axis longitudinally of the beam with means, such as an electric motor, to drive said shaft. A drum connected to the counterpoise is mounted concentric to said shaft to rotate with the shaft and have movement longitudinally thereof, said drum being caused to move in longitudinal direction and the direction of said movement controlled by a member to frictionally engage the drum, the direction of travel of which member is controlled by and in accordance with the deflection of the scale beam.

A further object of the invention relates to means supported independently of the beam to co-operate with the beam to serve as yielding stops and restrain the deflecting movement of the latter within predetermined limits, and to partially counterbalance a load supported by the beam during the initial movement of the counterpoise upon the beam to the point of perfect balance, and to also partially counterbalance the weight of the counterpoise as the load is removed from the load receiver.

Another object of the invention relates to an improved arrangement and construction of dash pot for use in connection with the beam to steady the movement of the beam as the counterpoise approaches the point of perfect balance.

Other objects and advantages will hereinafter appear.

In the drawings accompanying and forming a part of this specification, Figure 1 is a front elevation of the counterpoise adjusting means the scale beam having been omitted for the purpose of clearness of illustration and only so much of the weighing mechanism being shown as is essential to an understanding of the invention.

Figure 2 is a cross sectional view of Figure 1 to show the arrangement and mounting of the friction member controlled by the deflection of the scale beam to control the travel, in longitudinal direction, of the drum of the counterpoise adjusting means.

Figure 3 is a front elevation of the scale beam to show the connection of the counterpoise with its adjusting means, and means connected to the beam to restrain the deflecting movement thereof within predetermined limits, and the connection of the dash pot to the beam to steady the movement thereof as the counterpoise approaches the point of perfect balance.

Figures 4 and 5 are cross sectional views to show the mounting of the drum upon the shaft, and Figure 6 is a cross sectional view taken substantially between the ends of the drum to show the arrangement of the drum and shaft.

Figure 7 is a plan view of the scale beam and the counterpoise adjusting means to show the relation between the same.

Figure 8 is a cross sectional view taken on the line 8—8 of Figure 7 looking in the direction of the arrow.

Figure 9 is a plan view of the counterpoise.

Figure 10 is a longitudinal sectional view of a portion of the beam and the counterpoise to show the manner of mounting the latter upon the beam.

Figure 11 is a longitudinal sectional view of the improved dash pot.

Figure 12 is an end elevation of the piston to operate in the dash pot.

Figure 13 is a sectional view of the cylinder of the dash pot taken on the line 13—13 of Figure 11 looking in the direction of the arrow.

Figure 14 is an enlarged end elevation of the means to co-operate with the scale beam to restrain the deflecting movement of the beam within predetermined limits; and Figure 15 is an enlarged view in perspective showing a modified arrangement of the means for restraining the deflecting movement of the beam within predetermined limits.

Similar characters of reference designate like parts throughout the different views of the drawings.

In the embodiment of the invention shown in the drawings the shelf portion of the scale structure is shown at 16 upon which is mounted a standard 17 carrying a scale beam 18 upon a knife edge pivot 19, said beam being arranged at the short end at one side of the pivotal support to support load supporting means therefrom and shown as having connected thereto a rod 20 which may be connected in the usual manner to the weighing levers of a platform scale (not shown). The beam is brought into equilibrium as a load is applied thereto or removed therefrom by counterpoise weight 21 movably mounted upon the beam. To prevent frictional retardation of the counterpoise in its movement the beam is arranged substantially of channel shape in cross section with the legs of the channel extending upward to form tracks. The counterpoise is arranged with two pairs of flanged wheels or rollers 22 to support the counterpoise upon the scale beam. The balance of the scale is regulable by a weight or weights 23 suspended from the extremity of the long end of the beam by a rod 24.

To automatically adjust or remove the counterpoise along the scale beam when the beam is deflected from the horizontal or equilibrium by a load placed upon the scale beam to counterbalance or weigh such load, or by the removal of the weight of such load from the scale beam, a pair of frictional contacting members are provided, one of which is in the form of a drum 25 journaled at its opposite ends in heads 26, said heads rotatably carrying flanged rollers or wheels 27 at opposite sides to engage upon a track or tracks 28, shown in the present instance as a pair of sectional tracks mounted upon the shelf 16 to extend longitudinally of the beam and along which the drum carrying rollers 27 are movable. The drum is connected to the counterpoise 22 by a rod 29 one end of which is connected to an upwardly extending projection 30 of one of the drum supporting heads while the other end is pivotally connected to the counterpoise, as at 31, Figures 9 and 10.

To rotate the drum a shaft 32 is journaled in bearings 33 fixed upon the shelf 16 which shaft is concentric with the drum. The shaft and drum are constructed and arranged so that the drum will participate in the rotary movement of the shaft and have movement longitudinally of the shaft. For this purpose the shaft is square in cross section and the drum has anti-friction bearings upon said shaft arranged at opposite ends of the drum. As shown in Figures 4 and 5 these bearings comprise rollers 34 rotatably mounted at one end of the drum to engage at opposite sides of the shaft as shown in Figure 4, while the rollers 35 of the bearing at the opposite end of the drum are arranged at opposite sides of the shaft but in angular relation to the rollers 34. The shaft is driven from a suitable source of power, shown as an electric motor M mounted in fixed position upon the shelf 16 and operatively connected to the shaft by reducing gearing consisting of a pinion 36 fixed to the shaft of the motor meshing with a gear 37 on a shaft 38 journaled in a bracket 39 carrying the shaft bearing 33 and fixed to the shelf, a pinion 40 meshing with a gear 41 fixed to the shaft 32. While I have shown the connection of the shaft and the drum as comprising a shaft square in cross section and the drum having anti-friction bearings thereon it will be obvious that any suitable connection may be provided so long as the drum is arranged to rotate with the shaft and have movement longitudinally thereof.

The adjustment of the counterpoise upon the beam is effected through the longitudinal movement of the drum and the longitudinal direction of movement of the drum is controlled by and in accordance with the deflection of the scale beam to overload or underload position and maintained against movement when the beam is in equilibrium. For this purpose a member is provided to have frictional contact with the periphery of the drum and is shown as comprising a friction disk 42 rotatably carried in the bifurcation of a member 43 having a pivotal support 44 to rotate on an axis transverse to the axis of the drum. This pivotal support is arranged to rotate on a vertical axis in a portion of a bracket 45 overhanging the drum, said bracket being mounted upon the shelf 16. The member 43 is carried by a yoke shaped member 46 having a vertical stud 47 rotatably engaging in an opening in the bracket and extending through the shelf 16 in line with the pivotal support 44 and below the axis of the drum as clearly shown in Figure 2. A clearance space, as shown at 51, is arranged between the connection of the yoke member 46 with the stud 47 and the bracket 45 whereby the friction disk will rest upon the drum by gravity, and to increase the frictional contact between the disk and drum weight 48 is mounted upon the stud 47. The yoke stud 47 and thereby the disk is operatively connected to the scale beam by a link 49 pivotally connected at one end to an arm 50 fixed to the stud 47 and the other end pivotally connected to a stud 52 fixed to and extending downwardly from the scale beam in line with the axis of the pivotal support of the beam and projecting through the shelf. By this arrangement of the link connection 49 with the stud 47 of the disk supporting yoke 46 and the stud 52 of the scale beam the disk when the beam is in eqilibrium will be maintained in position to travel in a direction at right angles to the axis of the drum and maintain the latter against longitudinal movement. The drum is driven in the direction indicated by the arrow in Figure 8 causing the disk to rotate in the direction indicated by the arrow. As a load is applied to the beam and causing the same to be deflected upward to the position shown by the dotted line 18$^a$ in Figure 3 the friction disk, will be adjusted to travel in a direction or rotate on an axis, in angular relation to the axis of the drum as shown in Figure 7 thereby exerting an axial thrust upon the drum to cause the drum to move longitudinally in the direction as indicated by the arrow $c$ in Figure 7 and thereby moving the counterpoise 31 outward on the beam to position to counterbalance the load supported by the short end of the beam. It will be obvious that as the counterpoise approaches the point of perfect balance and the beam moves to horizontal position or equilibrium that the angular relation of the disk to the drum will be gradually decreased and thereby the speed of travel of the drum in longitudinal direction will be gradually decreased as well as the speed or travel of the counterpoise upon the beam as the latter approaches the point of perfect balance. When a load is removed from the beam and the beam is deflected downwardly by the weight of the counterpoise to the position indicated by the dotted line 18$^b$ in Figure 3 the direction of travel of the disk 42 with relation to the axis of the drum will be in a direction reverse to that when the beam is deflected as shown in dotted lines in Figure 7 and thereby exerting an axial thrust upon the beam to move the same longitudinally in reverse direction and therewith the counterpoise to bring the beam to initial position of equilibrium or no load position, the speed of travel of the counterpoise gradually decreasing as it approaches such position in a manner similar to that hereinbefore described when the counterpoise is adjusted to perfect balance position in counterbalancing a load carried by the beam.

To totalize the weight of successive weighings, a counter, shown in a general way at C, is mounted upon the shelf 16 and is actuated through the movement of the drum by a rack 55 carried by the drum supporting heads 26 to extend parallel with and below the drum, said rack meshing with a gear 56 which meshes with a gear 57 having a bevel pinion 58 rotatable therewith meshing with a bevel pinion 59 operatively connected to the counter mechanism. Suitable ratchet mechanism is provided whereby as the drum is moved to position the counterpoise to counterbalance a load the counter will be advanced and as reverse movement is imparted to the drum no movement will be imparted to the counter mechanism. The drum carrying heads 26 may also be connected by a tie rod 60 extending parallel with and above the rack 55.

Means is provided to restrain the deflecting movement of the beam 18 within predetermined limits, and which also operates to partially counterbalance a load applied to the beam during the initial movement of the counterpoise upon the beam to the point of balance, and to partially counterbalance the weight of the counterpoise upon the beam as the latter is removed from the beam during the initial movement of the counterpoise to normal position of equilibrium, comprising pendulum weight supported independently of the beam and with which the beam is adapted to co-operate as it is deflected to a predetermined point from the horizontal. This pendulum weight comprises a pair of levers 61, 62 (Figures 3 and 15) pivotally supported upon a shaft 63 mounted in a bracket 64 fixed to a platform or shelf 65 suspended below the shelf 16 by rods 66, each of the levers having an arm 67, 68 fixed thereto adjustably carrying weights 69, 70, said arms being arranged whereby the weights will automatically assume a position by gravity below the pivotal support of the levers with the levers extending laterally from the pivotal support, the levers being constructed and arranged with the lever 61 above the lever 62. The levers are also arranged with auxiliary weight adjustably mounted on arms 71—72 extending from the levers substantially at right angles to the weight carrying arms 69—70 to regulate the pendulum weight. A rod 73 is pivotally connected at one end and suspended from the long end of the beam to extend through the shelf 16 and arranged with a bifurcation at the lower end, the one leg 74 of the bifurcation being shorter than the other leg 75 and having a downwardly inclined hook to engage over a pin extending transversely of a bifurcation at the end of the lever 61, as shown at 76, while the extremity of the longer leg is upwardly hooked to engage under a pin extending transversely of a bifurcation at the end of the lever 62, as shown at 77. Should the beam be deflected downward to the dotted line position 18$^b$ as by the removal of a load from the beam and the counterpoise having been adjusted outward on the beam, the hook of the bifurcation leg 74 will co-operate with the lever 61 to move the same in the direction indicated by the dotted pendulum, the weight connected to said lever yieldingly resisting or restraining the downward movement of the beam, and further operates in co-operation with the counterpoise to bring the beam to position of equilibrium or the weighing mechanism to counterbalancing position. Should the beam be deflected upward as indicated by the dotted line 18$^a$ in Figure 3 the hooked end of the longer bifurcation leg 75 will co-operate with the lever 62 to move the same upward, which movement will be resisted or restrained by the pendulum weight connected to such lever and serve to assist in the counterbalancing of the load during the initial movement of the counterpoise upon the beam. The reverse movement of the lever 61 is limited by an adjustable stop 78 co-operating with a lug 79 on the arm, and a stop 80 to be engaged by the weight carrying arm 67, and the reverse movement of the lever 62 is limited by an adjustable stop 81 co-operating with a lug 82 on the lever and a stop 83 to be engaged by the weight carrying arm 68 (Figure 15).

In the construction of the other means for restricting the deflecting movement of the beam a pair of levers 61', 62' are pivotally supported upon the shaft 62 in the bracket 64, and shown as an anti-friction bearing support, and each of the arms is arranged with regulable weights as shown at 72'. The levers are also arranged with arms adjustably carrying pendulum weights 69', 70' and the reverse movement of the levers being limited by stops 80', 83' co-operating with the pendulum weight carrying arms. Auxiliary pendulum weight mechanism as mounted upon the levers 61', 62' and through which the levers co-operate with the beam to restrain the deflecting movement of the latter. This auxiliary pendulum weight mechanism comprises a lever 85 having a knife edge bearing support upon each lever 61', 62', as at 86, each lever 85 having an arm 87 adjustably carrying a pendulum weight 88. The one end of one arm is bifurcated with a pin extending transversely thereof, as at 89, with which the hook of the short leg 74 of the bifurcation of the rod 73 co-operates, and the one end of the other lever has a bifurcation with a transversely extending pin, as at 90, with which the hooked end of the long leg 75 of the bifurcation of the lever 73 co-operates. Each of the auxiliary levers at the ends opposite to the bifurcation has a regulable weight 91 adjustably mounted thereon, and they have a limited movement between a pair of adjustable stops 92 shown in the form of set screws carried by the respective levers 61', 62'. In operation as the beam is deflected either upwardly or downwardly from the horizontal the hooks of the bifurcation legs of the rod 73 will co-operate with either one of the auxiliary pendulum weight carrying levers 85, which will initially restrain deflecting movement of the beam. However, should the pendulum weights 88 not be sufficient to restrain the movement of the beam by the arrangement of the stops 92 the load of a pendulum weight 69' or 70' is transferred to said auxiliary lever through the movement of the levers 61', 62'.

To steady the beam 18 as the counterpoise approaches the point of perfect balance a dash pot is connected to the long end of the beam. This dash pot is mounted upon the shelf 65 and comprises a liquid carrying cylinder 93 closed at one end and having a perforated flange to secure the same upon the shelf. A piston 94 is connected to the beam and reciprocable in the cylinder by a rod 95 extending through an opening in the closure 96 for the open end of the cylinder and through the shelf and connected to the scale beam 18, the piston being reciprocated by and in accordance with the deflection of the beam. The dash pot is of a particular construction and arrangement whereby to provide a more efficient device of this character. The inner wall of the cylinder is arranged with a restricted annular portion or annulus 97 located substantially midway between the ends with recesses 98 arranged in the wall of the cylinder at opposite sides of the annulus, which recesses are in the nature of by-pass ports. The piston also has an enlarged annular portion 99 substantially midway between the ends thereof, that is, it is of greater diameter at this portion, the wall of the piston converging or inclining toward the axis and from opposite sides of said annular enlarged portion, as clearly shown in Figure 11, such enlarged portion being of a diameter as to permit the same to have a sliding fit with the cylinder annulus 97. The wall of the piston at opposite sides of the annulus 99 is arranged with slots 100 to co-operate with the cylinder recesses 98 to by-pass the liquid from the cylinder at one side of the piston to the opposite side thereof. The piston has restricted ports 101 in a web located in a plane with the annulus 99, which web is arranged with a hub 102 whereby the piston is mounted upon its actuating rod 95. The ports 101 permit a restricted flow of liquid from the cylinder at one end of the piston to the cylinder at the opposite end of the piston. The inner wall of the cylinder 93 is also arranged with restricted annular portions 103, 104 at substantially equal distances at opposite sides of the annulus 97.

In operation the connection of the piston with the scale beam is such so that the enlarged annular portion of the piston is in register with the central annulus 97 when the beam is in position of equilibrium. As a load is placed upon the beam and deflected upward there will be a momentary resistance to the movement of the beam, the passage of the liquid from one side of the piston to the opposite side being only through the restricted ports 101; but as the enlarged piston portion 99 is moved out of register with the cylinder annulus 97 the piston recesses 100 will come in register with the cylinder recesses 98 permitting of an increased flow of the liquid past the piston; and as the piston moves upward due to the gradual restricting of the cylinder above the cylinder recesses 98 there will be a gradual decrease of flow of liquid past the piston, and as the piston approaches the restricted cylinder portion 103 the flow of the liquid past the piston is restricted and thereby the movement of the piston retarded. As the beam is brought to position of equilibrium by the adjustment of the counterpoise on the beam to the point of perfect balance the enlarged piston portion will come in register with the cylinder annulus 97 increasing he resistance to the movement of the beam, he only passage of the liquid from one side of the piston to the opposite side being through the restricted ports 101 and should there be any tendency of the beam to vibrate upward or downward this will be checked by the resistance of the liquid as the only passage of the liquid will be through the restricted piston ports. When the load is removed from the beam and the beam moved or deflected to the position indicated by the dotted line 18$^b$ in Figure 3 the piston will coact with the restricted portion 104 in a manner similar to that above described in connection with the restricted cylinder portion 103, and as the beam reaches the horizontal or position of equilibrium any tendency of the beam to move above the horizontal will be retarded by the enlarged piston portion coming in register with the cylinder annulus 97 as above described.

The counterpoise adjusting means and scale beam is enclosed in a housing consisting of a frame structure S built up from angle iron upon the shelf 16 with panels of sheet material attached to said frame to serve as the enclosing walls, the front wall being removably and hingedly connected to the frame whereby access may be readily had to the mechanism, or the front panel or wall may be arranged with a window.

Having thus described my invention, I claim:

1. In weighing mechanism, the combination with a beam, of counterpoise movable upon the beam; a shaft rotatable on an axis longitudinally of the beam; a drum having connection with the counterpoise, supported concentric of the shaft to rotate with the latter and have movement longitudinally thereof; means traveling in a direction transverse to the axis of the drum and adapted to have adjustment to change the direction of travel thereof in angular relation to the axis of the drum and coacting with the drum to impart longitudinal movement thereto; and means to connect said means to the beam to control and adjust said means to impart longitudinal movement to the drum by and in accordance with the deflection of the beam.

2. In weighing mechanism, the combination with a scale beam, of counterpoise movable upon the beam; a rotatable shaft extending longitudinally of the beam; and a pair of frictional contacting members one of which is connected to the counterpoise and mounted concentrically of and participating in the rotation of the shaft and to have longitudinal movement thereof, and the other of which members is adapted to travel in a direction transversely of the axis of rotation of the first member and to have adjustment to change the direction of travel thereof in angular relation to the axis of rotation of the first member.

3. In weighing mechanism, the combination with a scale beam, of counterpoise movably mounted upon the beam; a rotatable shaft; a drum rotatably supported concentric with the shaft, said drum and shaft being constructed and arranged whereby the drum is adapted to participate in the rotative movement of the shaft and to have movement longitudinally thereof; and a member to frictionally contact with the drum to travel in a direction transverse to the axis of the drum with the beam in equilibrium, and means operated by the beam to change the direction of travel of the friction member in angular relation to the axis of the drum by and in accordance with the deflection of the beam and cause said member to coact with the drum to impart longitudinal movement thereto for the purpose specified.

4. In weighing mechanism, the combination with a scale beam, of counterpoise movably mounted upon the beam; a rotatable shaft; a drum rotatably supported concentric with the shaft, said drum and shaft being constructed and arranged whereby the drum is adapted to participate in the rotative movement of the shaft and to have movement longitudinally thereof; a friction disk to contact with the drum; a support for said disk to have movement on an axis transverse to the axis of the drum; and means to connect said support to the beam operative to maintain the disk in position to rotate on an axis parallel with the axis of the shaft when the beam is in equilibrium and to change the axis of rotation of said disk in angular relation to the axis of the drum by and in accordance with the deflection of the beam for the purpose specified.

5. In weighing mechanism, a scale beam; counterpoise movably mounted upon the beam; a shaft journaled in fixed bearings to rotate on an axis longitudinally of the beam; a drum connected to the counterpoise mounted on the shaft to rotate therewith and have movement longitudinally of the shaft; a friction disk to contact with the drum connected to the beam, and means to connect said disk to the beam and operative in the normal position of equilibrium of the beam to position the disk to rotate on an axis parallel with the drum and change the axis of rotation of said disk in angular relation to the axis of the drum by the deflection of the beam for the purpose specified.

6. In weighing mechanism, a beam; counterpoise movably mounted upon the beam; a shaft journaled in fixed bearings to rotate on an axis longitudinally of the beam; a drum connected to the counterpoise; anti-friction bearings to mount the drum upon the shaft to participate in the rotation of the shaft and have movement longitudinally thereof; a member to frictionally contact with the drum; means operated from the beam to normally position said member to travel in a direction transverse of the axis of the drum and adapted to change the direction of travel thereof in angular relation to the axis of the drum to impart longitudinal movement to the latter for the purpose specified.

7. In weighing mechanism, a beam; counterpoise movably mounted upon the beam; a drum connected to the counterpoise supported to rotate on an axis and have movement longitudinally of the beam; a friction disk; means to support said disk to frictionally engage the drum by gravity and have adjustment on an axis transverse to the axis of the drum; and a connection between said disk support and beam whereby as the beam is in equilibrium the disk will rotate on an axis parallel with the axis of the drum and by a deflection of the beam will be adjusted to rotate on an axis in angular relation to the axis of the drum for the purpose specified.

8. In weighing mechanism, a beam; counterpoise movable upon the beam; a shaft journaled in fixed bearings to rotate on an axis longitudinally of the beam; means to rotate the shaft; a drum concentric of the shaft adapted to participate in the rotation of the shaft and have movement longitudinally thereof; heads in which said drum is journaled at opposite ends; wheels rotatably mounted at opposite sides of said heads; a track on which said wheels travel; a connection between the drum and counterpoise; and a member to frictionally contact with the drum, said member in the normal position of equilibrium of the beam travelling in a direction transverse to the axis of the drum and the direction of travel thereof adapted to be changed in angular relation to the axis of the drum by and in accordance with the deflection of the beam for the purpose specified.

9. In weighing mechanism, a beam; counterpoise movable upon the beam; a shaft journalled in fixed bearings to rotate on an axis longitudinally of the beam; a drum connected to the counterpoise mounted on the shaft to participate in the rotation of the shaft and have movement longitudinally thereof; a member to frictionally contact with the drum normally travelling in a direction transverse to the axis of the drum and the direction of travel thereof adapted to be changed in angular relation to the axis of the drum by the deflection of the beam to impart longitudinal movement to the drum and adjust the counterpoise upon the beam to bring the latter into equilibrium; a rack longitudinally movable with the drum; a counter; and an operative connection between the rack and counter to advance the latter as the drum travels in one direction for the purpose specified.

10. In weighing mechanism, a beam having load supporting means connected thereto; counterpoise automatically adjustable upon the beam as the latter is deflected; and pendulum weight automatically connected to the beam when the beam is deflected beyond a predetermined point, comprising a pair of levers, weights connected to said levers normally maintaining the levers in position with the weights below the center of gravity, and means connected to the beam to cooperate with one of said levers when the beam is moved below the horizontal and to co-operate with the other lever when the beam is moved to position above the horizontal.

11. In weighing mechanism, a beam having load supporting means connected thereto; counterpoise automatically adjustable upon the beam as the latter is deflected; and pendulum weight automatically connected to the beam when the beam is deflected beyond a predetermined point, comprising a pair of pivotally supportd levers, weights connected to each of said levers normally maintaining the levers in position with the weights below the center of gravity, a rod connected to the beam to extend vertically therefrom arranged with means to engage with one of said levers as the beam is moved to position below the horizontal and to engage the other lever when the beam is moved to position above the horizontal.

12. In weighing mechanism, a beam arranged for the connection of a load support, adjustable counterpoise to counterbalance a load supported by the beam, and auxiliary counterpoise normally free of the beam and adapted to be applied thereto when the beam is deflected beyond predetermined points above and below the horizontal, comprising a pair of weighted main levers normally maintained in a position with the weights below the center of gravity, auxiliary weighted levers carried by said main levers, and a connector carried by the beam adapted to engage with an auxiliary lever and apply the weight thereof to the beam when the beam is deflected to a predetermined point above or below the horizontal and to apply the weight of the main levers to the beam through the auxiliary levers by a further deflection of the beam.

13. In weighing mechanism, a scale beam, adjustable counterpoise to bring the beam into balance when moved out of equilibrium, and power operated means to adjust the counterpoise including a rotatable member and a disk to frictionally engage said member, the direction of travel of which disk is changeable in angular relation to said member, and a connection between said disk and the beam to control the direction of travel thereof through the deflecting movements of the beam.

Signed at Passaic, in the county of Passaic and State of New Jersey, this 8th day of August A. D. 1922.

HERBERT L. MERRICK.